(12) United States Patent
Asakura et al.

(10) Patent No.: US 8,830,378 B2
(45) Date of Patent: Sep. 9, 2014

(54) IMAGE CAPTURING SYSTEM AND IMAGE CAPTURING METHOD, INVOLVING IMAGE RESTORATION PROCESSING

(75) Inventors: Ayako Asakura, Hino (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 657 days.

(21) Appl. No.: 13/065,826

(22) Filed: Mar. 29, 2011

(65) Prior Publication Data

US 2012/0249818 A1 Oct. 4, 2012

(51) Int. Cl.
  *G03B 3/00* (2006.01)
  *H04N 5/228* (2006.01)
(52) U.S. Cl.
  CPC ................ *H04N 3/23212* (2013.01)
  USPC .................... 348/345; 348/222.1; 396/55
(58) Field of Classification Search
  USPC .......... 348/345–357; 396/104, 121
  See application file for complete search history.

(56) References Cited

U.S. PATENT DOCUMENTS

| 5,003,339 | A  | * | 3/1991 | Kikuchi et al. | 396/100 |
|---|---|---|---|---|---|
| 7,469,099 | B2 | * | 12/2008 | Terayama | 396/123 |
| 7,627,239 | B2 | * | 12/2009 | Terayama | 396/123 |
| 7,724,300 | B2 | * | 5/2010 | Misawa et al. | 348/345 |
| 7,751,701 | B2 | * | 7/2010 | Endo | 396/123 |
| 7,844,175 | B2 | * | 11/2010 | Gotanda | 396/123 |
| 8,145,049 | B2 | * | 3/2012 | Hirai et al. | 396/123 |
| 8,331,713 | B2 | * | 12/2012 | Shiraki et al. | 382/255 |
| 8,456,567 | B2 | * | 6/2013 | Endoh et al. | 348/349 |
| 2002/0080261 | A1 | * | 6/2002 | Kitamura et al. | 348/349 |
| 2004/0100573 | A1 | * | 5/2004 | Nonaka | 348/345 |
| 2005/0128323 | A1 | * | 6/2005 | Choi | 348/239 |
| 2006/0002698 | A1 | * | 1/2006 | Terayama | 396/123 |
| 2006/0066744 | A1 | * | 3/2006 | Stavely et al. | 348/352 |
| 2006/0127080 | A1 | * | 6/2006 | Mori et al. | 396/121 |
| 2007/0052835 | A1 | * | 3/2007 | Onozawa | 348/345 |
| 2007/0064145 | A1 | * | 3/2007 | Sugimoto | 348/345 |
| 2007/0280662 | A1 | * | 12/2007 | Endo | 396/67 |
| 2008/0159727 | A1 | * | 7/2008 | Hamamura et al. | 396/104 |
| 2009/0244312 | A1 | * | 10/2009 | Nakagawa | 348/222.1 |
| 2009/0244354 | A1 | * | 10/2009 | Sakaguchi | 348/333.02 |
| 2009/0263033 | A1 | * | 10/2009 | Weston | 382/236 |
| 2009/0290041 | A1 | * | 11/2009 | Tamaru | 348/222.1 |
| 2010/0033617 | A1 | * | 2/2010 | Forutanpour | 348/345 |
| 2010/0128162 | A1 | * | 5/2010 | Tanaka | 348/345 |
| 2010/0149363 | A1 | * | 6/2010 | Inomata et al. | 348/222.1 |
| 2010/0322611 | A1 | * | 12/2010 | Yoshida et al. | 396/104 |
| 2011/0058032 | A1 | * | 3/2011 | Park et al. | 348/139 |
| 2012/0148109 | A1 | * | 6/2012 | Kawamura et al. | 382/106 |
| 2012/0236170 | A1 | * | 9/2012 | Li | 348/222.1 |

FOREIGN PATENT DOCUMENTS

| JP | 11-261797 | 9/1999 |
|---|---|---|
| JP | 2002-023042 | 1/2002 |
| JP | 2002-333568 | 11/2002 |

OTHER PUBLICATIONS

Japanese Office Action, dated May 14, 2013, issued in corresponding Japanese Patent Application No. 2009-141981.

* cited by examiner

*Primary Examiner* — Tuan Ho
*Assistant Examiner* — Selam Gebriel
(74) *Attorney, Agent, or Firm* — Kenyon & Kenyon LLP (57) ABSTRACT

When a photographer presses a release button by a predetermined amount after focusing on a first object, a focus lens is moved in an optical axis direction so that a second object is brought into focus, whereupon image pickup is performed while focusing on the second object. Image processing is then performed on image data obtained in the image pickup.

17 Claims, 10 Drawing Sheets

IMAGE CAPTURING SYSTEM AND IMAGE CAPTURING METHOD, INVOLVING IMAGE RESTORATION PROCESSING

FIELD OF THE INVENTION

This invention relates to an image capturing system and an image capturing method.

BACKGROUND OF THE INVENTION

JP2002-023042A discloses a camera which includes an automatic multipoint focus detection device capable of executing autofocus in a single focus detection zone selected by a photographer from a plurality of focus detection zones.

When an effective defocus amount cannot be obtained in the zone selected by the photographer, the camera disclosed in JP2002-023042A executes autofocus in a zone close to the selected zone.

SUMMARY OF THE INVENTION

An image capturing system according to an aspect of this invention includes: a focus position moving unit that moves a focus position to a first focus position in which a first object is brought into focus and a second focus position which is different to the first focus position; an image acquisition unit that obtains image data by performing image pickup in the second focus position; and an image processing unit that performs image processing on the obtained image data.

An image capturing method according to another aspect of this invention includes: moving a focus position from a first focus position relating to a first object to a second focus position after bringing the first object into focus in order to obtain an image in which the first object is in focus; obtaining image data by performing image pickup in the second focus position; and performing image processing on the obtained image data.

DESCRIPTION OF THE PREFERRED EMBODIMENTS

Figure 1:
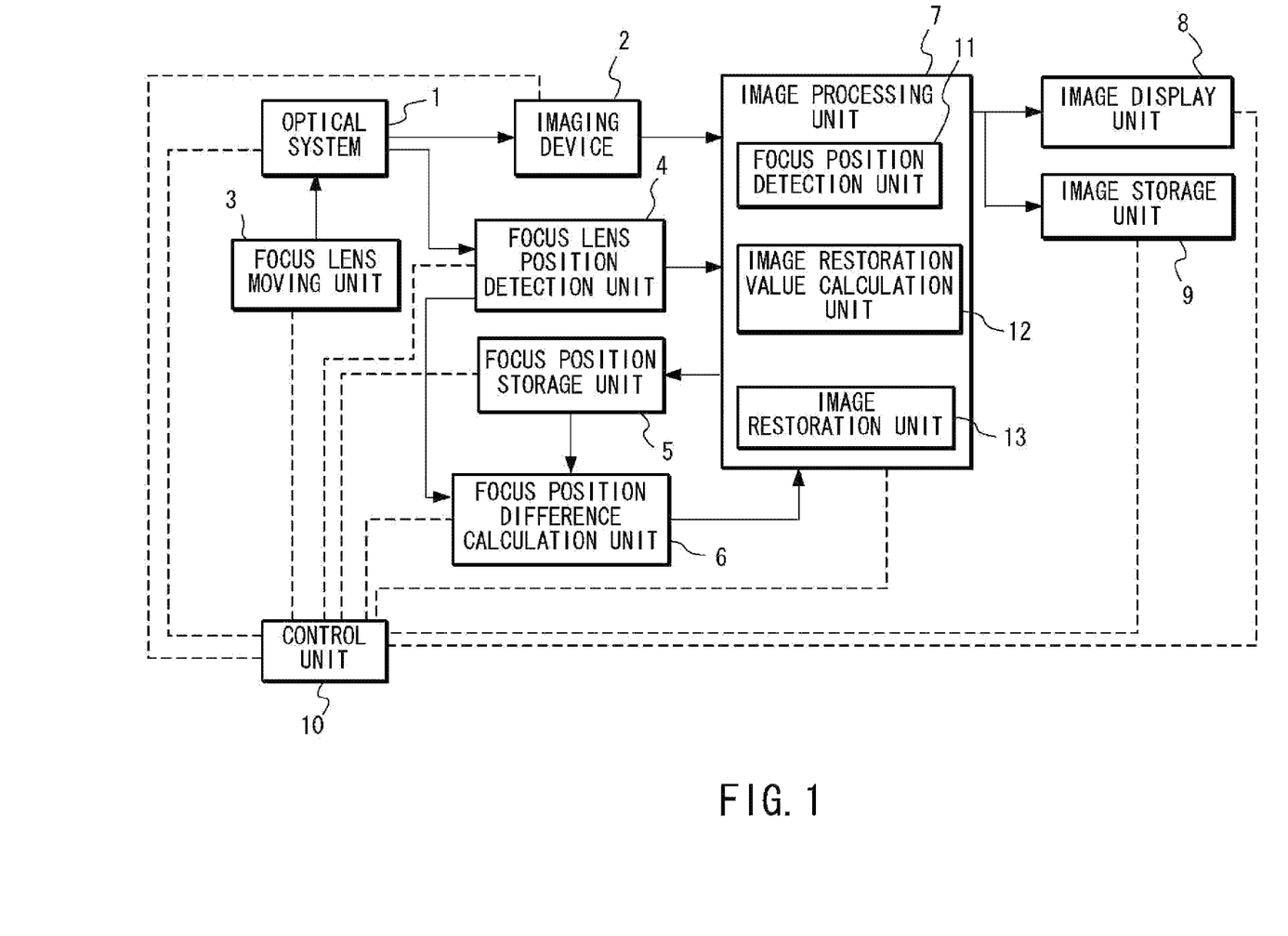
FIG. 1 is a schematic block diagram showing an image capturing system according to a first embodiment.

A first embodiment of this invention will be described using FIG. 1. FIG. 1 is a schematic block diagram showing an image capturing system according to the first embodiment. It is assumed in the following description that a digital still camera (a camera hereafter) is used as the image capturing system.

The camera includes an optical system 1, an imaging device 2, a focus lens moving unit 3, a focus lens position detection unit 4, a focus position storage unit 5, a focus position difference calculation unit 6, an image processing unit 7, an image display unit 8, an image storage unit 9, and a control unit 10.

The optical system 1 is constituted by a plurality of lenses and an aperture, for example. Focus adjustment is performed by moving all or a part of the plurality of lenses in an optical axis direction as a focus lens. Characteristics of the optical system 1 will now be described.

Figure 2:
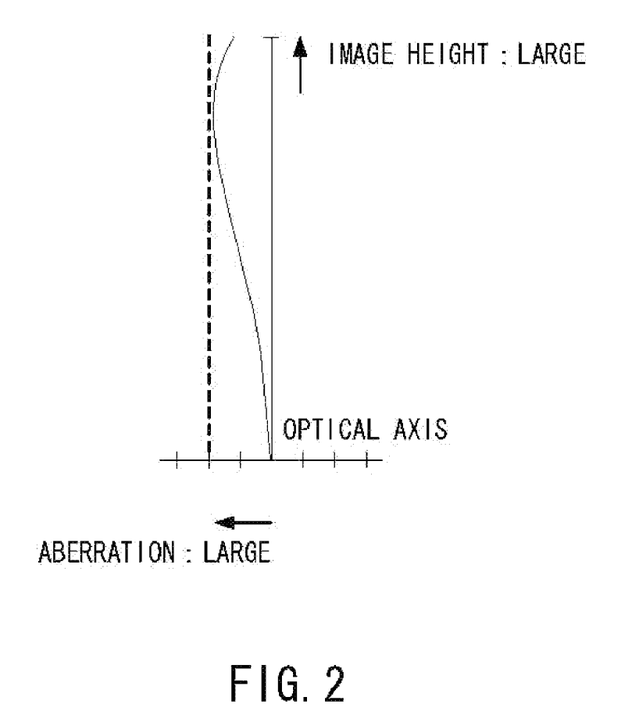
FIG. 2 is a graph showing a relationship between an image height and spherical aberration.

The optical system 1 is formed by combining a plurality of lenses. The optical system 1 is designed such that an image of an object is formed on a light receiving surface of the imaging device 2. Incidentally, the optical system 1 is normally designed such that aberration reaches a minimum on an optical axis. On the other hand, the aberration increases steadily as a distance from the optical axis increases (i.e. as an image height increases). As shown in FIG. 2, for example, spherical aberration increases as the image height increases. It is therefore difficult to form images of all objects existing within a composition determined by a photographer at identical aberration amounts.

Figure 3A:
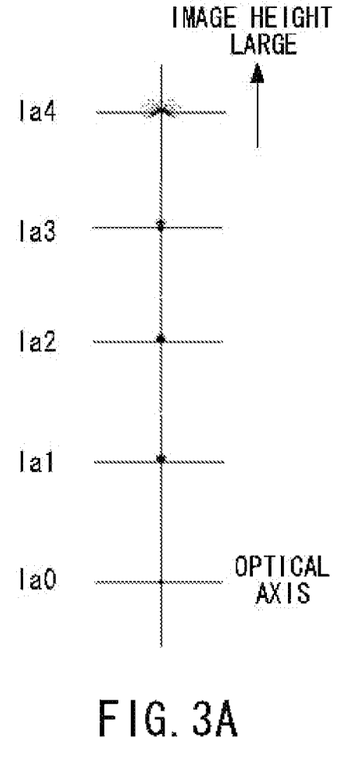
FIG. 3A is an image diagram illustrating a relationship between the image height and a shape of an object.
Figure 3B:
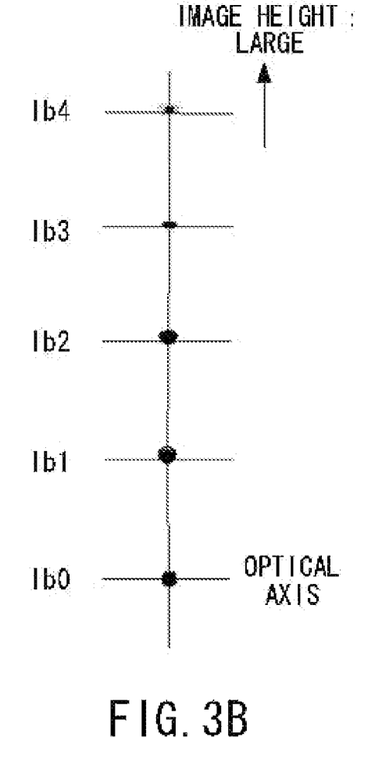
FIG. 3B is an image diagram illustrating the relationship between the image height and the shape of the object.

A relationship between the image height and a shape of an object will now be described using FIGS. 3A and 3B. FIGS. 3A and 3B show the manner in which a plurality of points provided on the object side are formed into images by the optical system. It is assumed here that each of the plurality points existing on the object side is disposed discretely either on the optical axis or in a direction heading away from the optical axis (i.e. an object height increasing direction). FIGS. 3A and 3B show images (point images) Ia0 to Ia4, Ib0 to Ib4 of each point on the object side. It should be noted that the point images shown in FIGS. 3A and 3B represent simulation results rather than actually photographed images.

FIG. 3A shows a case in which image pickup is performed while focusing on the point (object) disposed on the optical axis. In FIG. 3A, the point disposed on the optical axis is in focus, and therefore a surface area of the formed point image (object image) Ia0 is small. As the image height increases, however, a focus deviation increases, and therefore respective surface areas of the point images Ia1 to Ia4 increase. Furthermore, the shapes of the point images steadily become rotationally asymmetrical as the image height increases. This occurs due to aberration such as coma aberration and astigmatism, for example.

It is possible to create a focused image from an image of an object that is out of focus by performing image processing. In this image processing, a focused image can be created from an unfocused image through comparatively simple image processing as long as the aberration that occurs due to the focus deviation is rotationally symmetrical. When the aberration is rotationally asymmetrical, on the other hand, complicated image processing is required. It should be noted that when an aberration occurs in rotational symmetry, the point images take a rotationally symmetrical shape.

FIG. 3B shows a case in which the same plurality of points as those of FIG. 3A are photographed but image pickup is performed while focusing on a point disposed in a location having the greatest image height. As is evident from the point images shown in FIG. 3B, even when the point image Ib4 disposed in the location having the greatest image height is in focus, the point image Ib4 does not fully take a point shape due to the effects of aberration. In other words, the surface area of the point image is larger than that of the point image Ia0 disposed on the optical axis in FIG. 3A. Furthermore, the shape of the point image cannot be said to be rotationally symmetrical. However, in comparison with the point image Ia4 having the same image height in FIG. 3A, the shape of the point image is smaller. Therefore, although the shape of the point image is rotationally asymmetrical, the rotational symmetry thereof is more favorable than that of the point image Ia4.

Further, in FIG. 3B, a point having a great image height is brought into focus, and therefore the point image Ib0 on the optical axis is an unfocused image (the surface area of the point image is large). However, the optical system 1 is designed such that aberration decreases on the optical axis, and therefore the shape of the point image Ib0 on the optical axis is substantially rotationally symmetrical about the optical axis. Further, the other point images Ib1 to Ib3 are rotationally asymmetrical.

Hence, although variation occurs likewise in the shapes of the point images Ib0 to Ib4 shown in FIG. 3B, taken as a whole, the variation among the shapes of the point images is smaller than that of FIG. 3A. Therefore, by performing image pickup in the manner shown in FIG. 3B, an image that is, as a whole, in focus can be obtained through simpler image processing than the image processing required in FIG. 3A.

In this embodiment, image pickup is performed using the characteristics of the optical system 1 to create an image that is in focus as a whole through simple image processing.

The focus lens moving unit 3 moves the focus lens in the optical axis direction using an actuator or the like. In a case where focus adjustment is performed automatically using autofocus, the focus lens moving unit 3 moves the focus lens in the optical axis direction when a release button is pressed by a predetermined amount. When the focus lens is moved, the focus position varies, and therefore the focus lens moving unit 3 may also be referred to as a focus position moving unit.

The focus lens position detection unit 4 detects a position of the focus lens in the optical axis direction.

The focus position storage unit 5 stores a focus lens position corresponding to a focus position in which an object is brought into focus. The focus position storage unit 5 stores the focus lens position corresponding to the focus position when the photographer presses the release button by the predetermined amount during autofocus such that the object is brought into focus.

The focus position difference calculation unit 6 performs calculations using data (focus lens positions) in the focus position storage unit 5. For example, when data obtained by focusing on a first object (a focus lens position corresponding to a first focus position) and data obtained by focusing on a second subject (a focus lens position corresponding to a second focus position) are stored in the focus position storage unit 5, the focus position difference calculation unit 6 calculates a focus position difference between the first object and the second object from the respective data.

The imaging device 2 outputs an electric signal corresponding to light incident on the light receiving surface thereof as image data at a predetermined timing. The imaging device 2 may be a device known as a CCD (Charge Coupled Device) or a CMOS (Complementary Metal Oxide Semiconductor) sensor, or an imaging device of various other types.

The image processing unit 7 includes a focus position detection unit 11, an image restoration value calculation unit 12, and an image restoration unit 13.

The focus position detection unit 11 detects the focus position by performing a focus determination in a focus zone on the basis of a luminance component and so on of the electric signal output from the imaging device 2. In this embodiment, the focus zone is set in a predetermined zone including the optical axis, and the focus position is detected in the focus zone. Here, the position of the focus lens when the object is brought into focus is detected as the focus position.

The image restoration value calculation unit 12 calculates an image restoration value relative to the electric signal output from the imaging device 2 on the basis of the focus position difference calculated by the focus position difference calculation unit 6. The image restoration value is a value by which the obtained image data are corrected so that the image as a whole is in focus. Here, the image restoration value is a numerical value corresponding one-to-one to each pixel. However, a single image restoration value may correspond to a plurality of pixels.

The image restoration unit 13 corrects the image data on the basis of the image restoration value calculated by the image restoration value calculation unit 12. The corrected image data are output to the image display unit 8 and the image storage unit 9.

The image processing unit 7 also performs processing such as white balance adjustment and gradation/level correction. Image data processed by the image processing unit 7 are output to the image display unit 8 and the image storage unit 9.

The image processing unit 7 is constituted by a CPU, a ROM, a RAM, and so on. The ROM stores a control program and various data. The CPU activates the respective functions of the image processing unit 7 by executing calculations on the basis of the control program stored in the ROM.

The image display unit 8 is a color liquid crystal display (LCD) panel, an organic EL (OEL) display panel, or similar. The image display unit 8 displays a photographed image on the basis of the signal corrected by the image restoration unit 13.

The image storage unit 9 stores the image data corrected by the image restoration unit 13.

The control unit 10 is connected to the optical system 1, the imaging device 2, the focus lens moving unit 3, the image processing unit 7, and so on in order to control the entire camera, including these components. The control unit 10 is constituted by a CPU, a ROM, a RAM, and so on. The ROM stores a control program and various data. The CPU activates the respective functions of the control unit 10 by executing calculations on the basis of the control program stored in the ROM.

Figure 4:
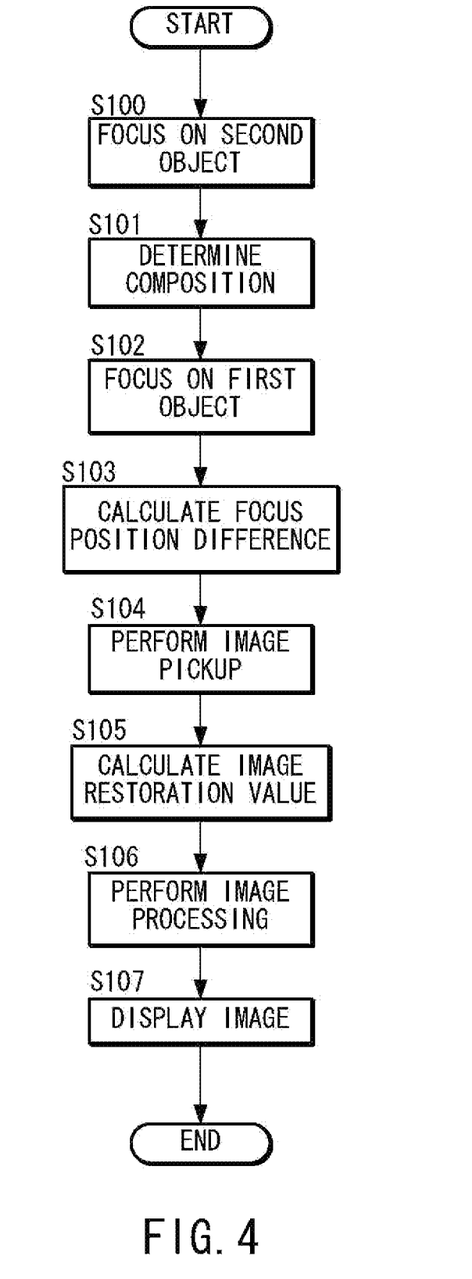
FIG. 4 is a flowchart showing control executed during image pickup according to the first embodiment.
Figure 5A:
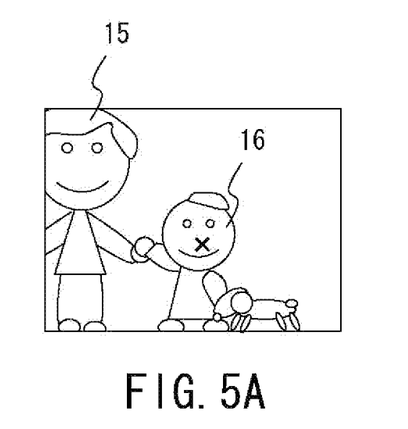
FIG. 5A is an image used during image pickup according to the first embodiment.
Figure 5B:
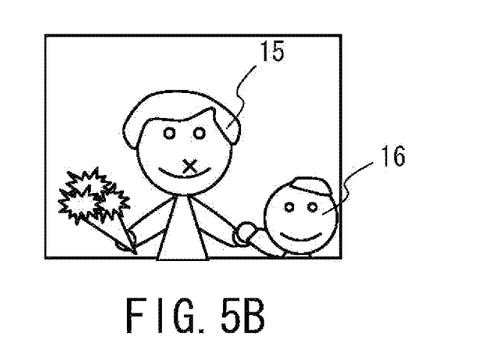
FIG. 5B is an image used during image pickup according to the first embodiment.

Next, control executed during image pickup according to this embodiment will be described using a flowchart shown in FIG. 4. Here, as shown in FIGS. 5A and 5B, a case in which the first object is located near the center of the optical axis on a composition determined by the photographer and the second object is located on an end portion side of the composition, or in other words in a position having a great image height, will be described as an example. It is assumed hereafter that a person holding a bouquet of flowers in FIG. 5B is a first object 15 and a person holding hands with the first object is a second object 16.

First, the photographer determines the position of the camera so that the second object 16 enters the focus zone.

When it is determined in a step S100 that the photographer has pressed the release button by the predetermined amount, the second object 16 is brought into focus (FIG. 5A). A focus lens position corresponding to a second focus position relative to the second object 16 is then stored in the focus position storage unit 5.

In a step S101, the photographer modifies the position of the camera so that the first object 15 enters the focus zone. Accordingly, the second object 16 moves to the end portion side of the image displayed on the image display unit 8. The composition is thus determined (FIG. 5B). It should be noted that the step S101 is behavior performed by the photographer and is not therefore included in the control executed by the image capturing system. Hereafter, behavior performed by the photographer is likewise not included in the control executed by the image capturing system.

When it is determined in a step S102 that the photographer has released the release button and then pressed the release button by the predetermined amount again, the first object 15 is brought into focus.

Figure 6:
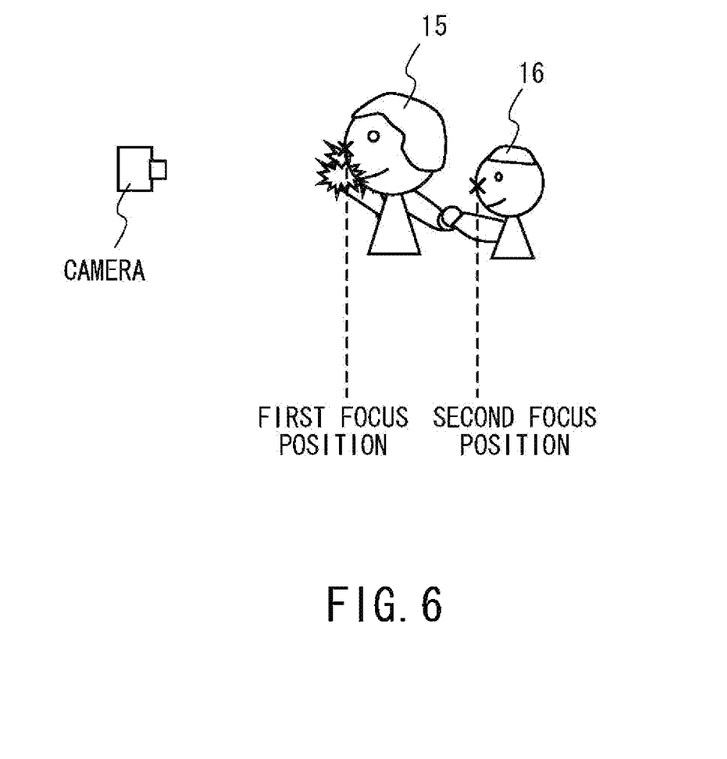
FIG. 6 is an image illustrating focus positions on a first object and a second object.

In a step S103, the focus position difference is calculated from the focus lens position corresponding to the second focus position and the focus lens position corresponding to a first focus position relative to the first object 15. As shown in FIG. 6, for example, the first object 15 and the second object 16 are at different distances from the camera, and therefore the respective focus positions thereof differ. In the step S103, a difference between the focus lens position corresponding to the first focus position and the focus lens position corresponding to the second focus position is calculated as the focus position difference.

When it is determined in a step S104 that the photographer has pressed the release button by a further predetermined amount, the focus lens is moved to the focus lens position corresponding to the second focus position, whereupon image pickup is performed. Accordingly, image pickup focusing on the second object 16 is performed on a composition where the first object 15 forms the center of the image, and as a result, image data are obtained.

In a step S105, the image restoration value is calculated on the basis of the focus position difference. Image processing is then performed using the image restoration value, the subject of the image processing is the image data obtained by performing image pickup focusing on the second object 16. The image restoration value is a value for correcting the image data to obtain an image in which the first object 15 is in focus. The image restoration value is calculated on the basis of the focus position difference using a preset look-up table (LUT).

In a step S106, image processing based on the image restoration value is performed on the image data obtained in the image pickup operation. As noted above, the image data obtained in the image pickup operation are image data obtained during image pickup focusing on the second object 16. Here, an image of the first object 15 is an unfocused image, or in other words an image having inferior image quality. However, the aberration causing the deterioration in image quality occurs in a substantially rotationally symmetrical amount, and therefore the deterioration in image quality on the image of the first object 15 can be restored through comparatively simple image processing. Meanwhile, since the image pickup operation is performed while focusing on the second object 16, the image of the second object 16 is an image focusing on a peripheral portion of the image. The image quality of this image is likewise adversely affected by aberration. However, the aberration causing the deterioration in image quality is small, and therefore the image exhibits favorable rotational symmetry. Hence, similarly to the first object 15, the deterioration in image quality on the image of the second object 16 can be restored through comparatively simple image processing. In certain cases, the image processing used on the first object 15 may also be used on the second object 16.

In a step S107, an image performed to image processing on the basis of the image restoration value is displayed on the image display unit 8. Further, the image data are stored in the image storage unit 9. It should be noted that a pre-correction image obtained when focusing on the second object 16 is not displayed on the image display unit 8.

A position of the camera when focusing on the first object 15 and a position of the camera when focusing on the second object 16 may be detected using a position sensor, an acceleration sensor, or a gyroscope, for example. The image restoration value may then be corrected by calculating a movement amount from the detection result. When the movement amount is known, a distance between the first object 15 and the second object 16 on the composition can be calculated. As a result, the image height of the second object 16 can be calculated. By calculating the image height of the second object 16 on the basis of the movement amount, the image restoration value can be corrected on the basis of the image height. When the focus position difference between the first object 15 and the second object 16 is substantially zero, the image restoration value is determined in accordance with the image height.

Effects of the first embodiment of this invention will now be described.

When the first object is positioned in the center of the composition used during the image pickup operation, the image pickup operation is performed while focusing on the second object, which has a greater image height on the composition than the first object. Hence, the image data obtained as a result are image data in which the second object is in focus. In this case, image pickup is performed while focusing on the second object, and therefore, when image processing is performed on the second object (for example, image processing to obtain an image in which the image of the second object is more in focus), the image processing can be simplified. It should be noted that in the image data obtained in this case, the first object may be out of focus. In this case, however, the focus deviation (blurring) occurring on the first object located close to the optical axis is rotationally symmetrical, and therefore an image which is clearly in focus can be created through comparatively simple image processing. Hence, by performing image processing on the first object, a clear image (a focused image) is created. As a result, an image that is in focus as a whole can be obtained through simple image processing.

By calculating the image restoration value on the basis of the focus position difference between the first focus position and the second focus position, an image in which both the first object and the second object are in focus can be obtained.

By storing the second focus position in the focus position storage unit 5, the focus position difference can be calculated quickly, and therefore image pickup can be performed quickly.

By ensuring that the image generated from the image data obtained while focusing on the second object is not displayed on the image display unit 8, an image on which the first object is not in focus need not be displayed on the image display unit 8. As a result, the photographer can be prevented from feeling a sense of unnaturalness.

Figure 7:
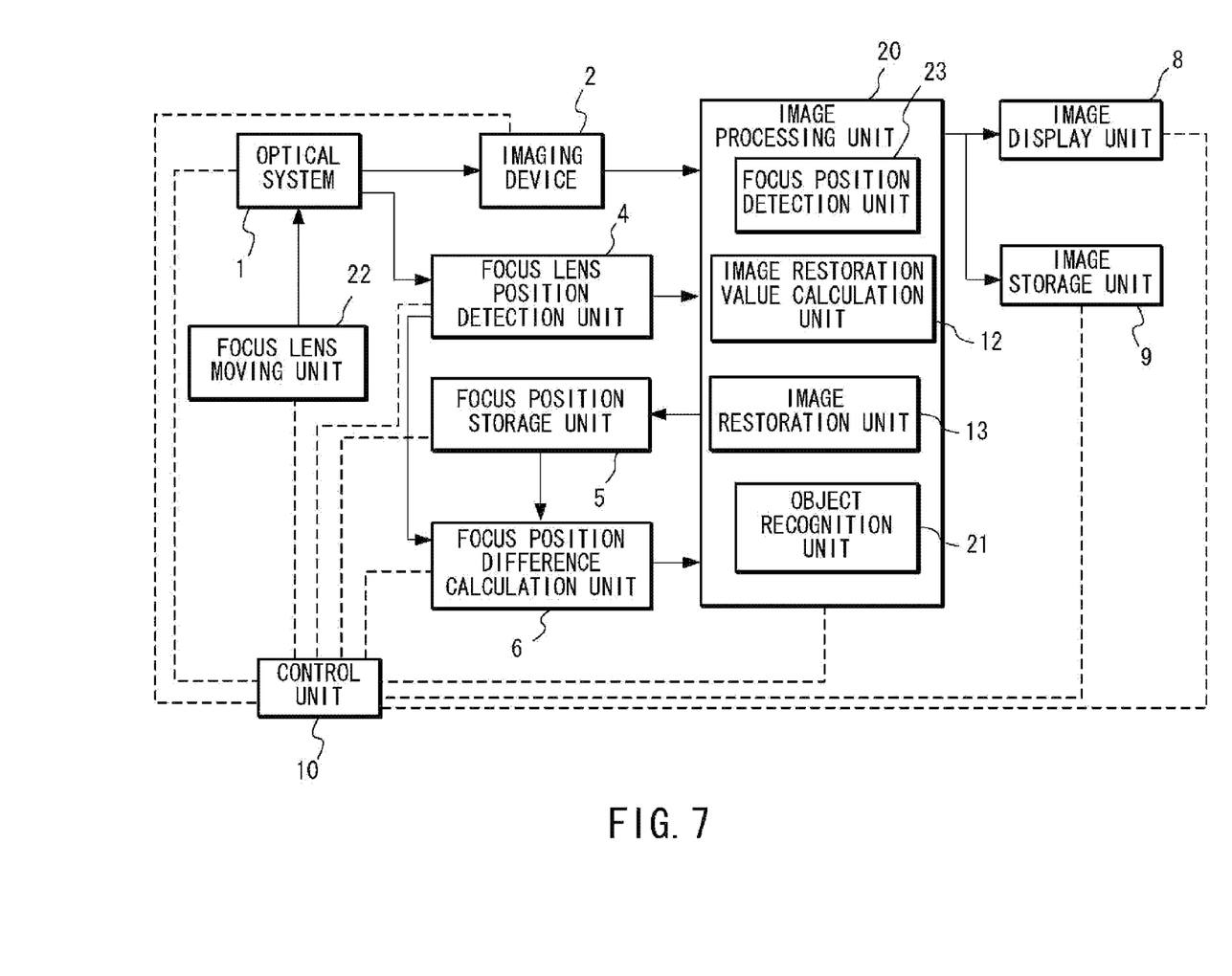
FIG. 7 is a schematic block diagram showing an image capturing system according to a second embodiment.

Next, a second embodiment of this invention will be described using FIG. 7. FIG. 7 is a schematic block diagram showing an image capturing system according to the second embodiment.

An image processing unit 20 according to the second embodiment includes a focus position detection unit 23, the image restoration value calculation unit 12, the image restoration unit 13, and an object recognition unit 21. Further, a focus lens moving unit 22 according to the second embodiment differs from its counterpart in the first embodiment.

The object recognition unit 21 detects an object from an image obtained via the imaging device 2. Object detection is performed by recognizing a face candidate part of the object using the Viola-Jones method, a method employing a color filter and graph matching, and so on, for example. It should be noted that the object recognition unit 21 is not limited to recognizing only the face candidate part of the object as long as the object can be recognized.

The focus position detection unit 23 detects the focus position while focusing on an AF point (a distance measuring point) selected by the photographer. Further, the focus position detection unit 23 detects the focus position while focusing on an object detected by the object recognition unit 21.

The focus lens moving unit 22 moves the focus lens in the optical axis direction so that the object having the greatest image height, from among the objects detected by the object recognition unit 21 during image pickup, is brought into focus. Further, the focus lens moving unit 22 moves the focus lens in the optical axis direction so that an object corresponding to the AF point selected by the photographer is brought into focus.

Figure 8:
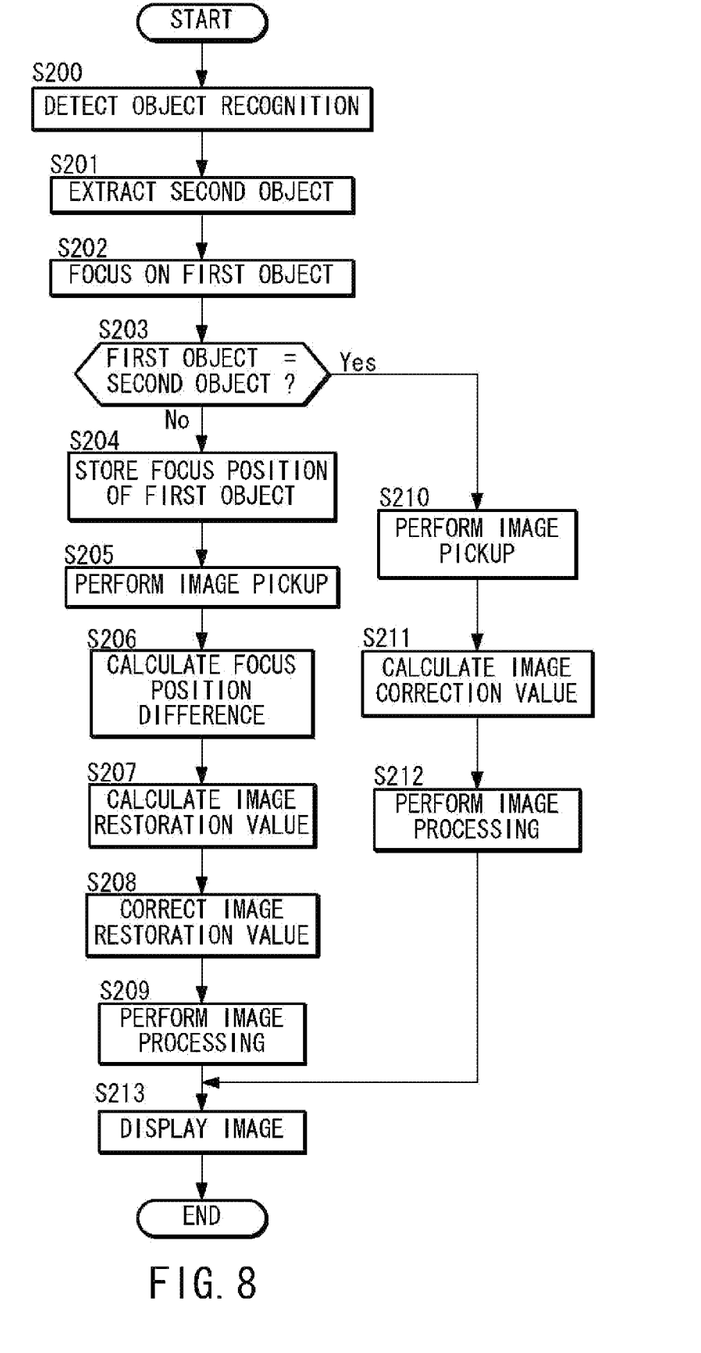
FIG. 8 is a flowchart showing control executed during image pickup according to the second embodiment.

Next, control executed during image pickup according to this embodiment will be described using a flowchart shown in FIG. 8. Here, a case in which the photographer performs image pickup while focusing on a person holding a bouquet of flowers on a composition shown in FIGS. 9A to 9C will be described as an example. Similarly to FIG. 5B, it is assumed hereafter that the person holding the bouquet of flowers is the first object 15 and the person holding hands with the person holding the bouquet of flowers is the second object 16.

Figure 9A:
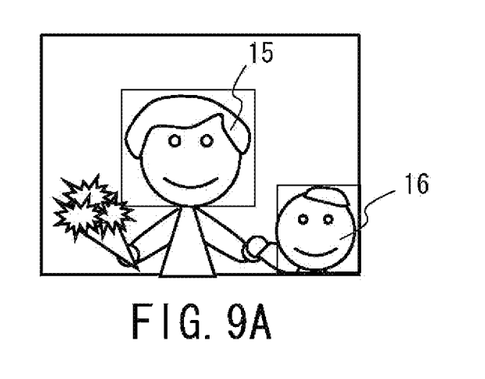
FIG. 9A is an image used during image pickup according to the second embodiment.

In a step S200, the first object 15 and the second object 16 are detected by the object recognition unit 21. Here, the fact that the first object 15 and the second object 16 have been detected is displayed on the image display unit 8 by surrounding face parts of the first object 15 and the second object 16 with rectangular frames, as shown in FIG. 9A.

In a step S201, the second object 16, which has the greatest image height of the detected objects, is extracted.

When it is determined in a step S202 that the release button has been pressed by the predetermined amount, the first object 15 selected by the photographer is brought into focus.

Figure 9B:
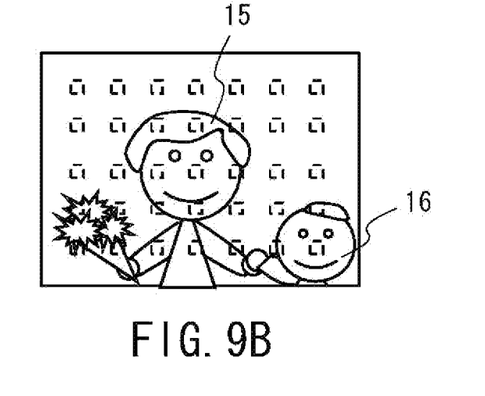
FIG. 9B is an image used during image pickup according to the second embodiment.
Figure 9C:
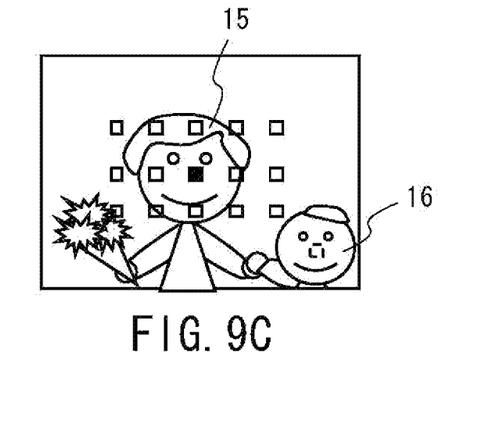
FIG. 9C is an image used during image pickup according to the second embodiment.

Here, an AF point selected by the photographer from a plurality of AF points is brought into focus. The plurality of AF points are disposed as shown in FIG. 9B, for example, so that the photographer can make a selection therefrom. Here, an AF point on the first object 15 in the center of an image surface is selected. As shown in FIG. 9C, when an AF point is selected by the photographer, the selected AF point (a black AF point in FIG. 9C) may be displayed in red, for example, and display of the AF points outside of the face part of the first object 15 may be terminated. At this time, the AF points on the second object 16 need not be displayed. As a result, the photographer can be prevented from feeling a sense of unnaturalness. It should be noted that the AF points may be provided only in locations near the optical axis and locations having a great image height rather than on the entire surface, as shown in FIG. 9B.

In a step S203, a determination is made as to whether or not the first object 15 and the second object 16 match. Here, the first object 15 is the object selected by the photographer. The second object 16 is the object having the greatest image height of the objects detected by the object recognition unit 21. When the second object 16 and the first object 15 do not match, the processing advances to a step S204, and when the objects match, the processing advances to a step S210. On the composition shown in FIGS. 9A to 9C, the second object 16 having the greatest image height is a different object to the first object 15 selected by the photographer, and therefore the processing advances to the step S204.

Here, a determination is made as to whether or not the first object 15 and the second object 16 match, but instead, a determination may be made as to whether or not a distance between the first object 15 and the second object 16 is smaller than a predetermined value. In this case, when the distance between the first object 15 and the second object 16 is equal to or greater than the predetermined value, the processing advances to the step S204, and when the distance between the first object 15 and the second object 16 is smaller than the predetermined value, the processing advances to the step S210.

In the step S204, the first focus position relating to the first object 15 is stored. In other words, the focus lens position corresponding to the first focus position is stored.

When it is determined in a step S205 that the photographer has pressed the release button by a further predetermined amount, the second object 16 is brought into focus, whereupon image pickup is performed.

In a step S206, the focus position difference is detected from the focus lens position corresponding to the first focus position and the focus lens position corresponding to the second focus position relative to the second object 16.

In a step S207, the image restoration value is calculated on the basis of the focus position difference. The image restoration value is calculated on the basis of the focus position difference using a preset look-up table (LUT) or a function.

In a step S208, the image restoration value is corrected in accordance with a condition of the optical system 1. The condition of the optical system 1 is information relating to a focal length, for example. When the optical system 1 is a zoom lens, for example, aberration occurs differently depending on whether the zoom lens is in a wide angle condition or a telescopic condition. In other words, different aberration occurs relative to an identical focus deviation (focus position difference). Hence, in this embodiment, the image restoration value is corrected in accordance with the condition of the optical system 1. By correcting the image restoration value in accordance with the condition of the optical system 1, an accurate image restoration value can be calculated.

The image restoration value is also corrected in accordance with characteristics of the optical system 1. The characteristics of the optical system 1 are determined when the optical system 1 is designed, and are represented by aberration information, a PSF, an LSF, and an MTF, for example. Hence, by setting correction values in advance in accordance with the characteristics of the optical system 1, the image restoration value can be corrected. These characteristics of the optical system 1 vary in accordance with the position of the object on the composition, or in other words the image height. Therefore, by correcting the image restoration value in accordance with the characteristics of the optical system 1, an accurate image restoration value can be calculated. Here, the second object 16 has a great image height on the composition, but since the second object 16 is in focus, aberration has a smaller effect on the second object 16 than on the first object 15. Accordingly, a correction value for the second object 16 is smaller than a correction value for the first object 15.

FIG. 3B shows a condition in which the point (object) having the greatest image height is in focus. In this condition, the point image on an uppermost level has the smallest size. Here, the respective points on the object side are coplanar (i.e. do not deviate in the optical axis direction), and therefore no focus position differences occur among the respective point images. Nevertheless, the point image on a lowermost level (on the optical axis) is large. Therefore, when a focus position difference occurs, the point image on the lowermost level (on the optical axis) becomes even larger than that shown in FIG. 3B.

In the first embodiment, the image restoration value is calculated on the basis of the focus position difference. In so doing, however, only a part added by the focus position difference is corrected. In other words, the point image made larger by the focus position is merely restored to the condition of the lowermost level in FIG. 3B. In this embodiment, on the other hand, the image restoration value is corrected in accordance with the characteristics of the optical system 1, and therefore the point image at the lowermost level in FIG. 3B can be made smaller.

It should be noted that when the focus position difference between the first focus position of the first object 15 and the second focus position of the second object 16 is substantially zero, the image restoration value is determined by the condition of the optical system 1 and the characteristics of the optical system 1.

In a step S209, correction (image processing) is performed on the image data obtained through image pickup on the basis of the image restoration value. The image data obtained through image pickup are image data focusing on the second object 16. By performing image pickup while focusing on the object having the greatest image height, an image on which the second object 16 having the greatest image height is in focus can be obtained. On the other hand, the image data obtained through image pickup are image data in which the first object 15 is not in focus. However, the first object 15 is positioned further toward the optical axis side than the second object 16, and therefore a focused image can be created by performing comparatively simple image processing.

When it is determined in the step S203 that the second object 16 and the first object 15 match, image pickup is performed in the step S210. In this case, the object selected by the photographer as a focus subject is in the position having the greatest image height on the composition. For example, in this case, the AF point selected by the photographer on the composition shown in FIGS. 9A to 9C is on the second object 16. When it is determined in the step S210 that the release button has been pressed by the further predetermined amount, the object corresponding to the AF point selected by the photographer is brought into focus, whereupon image pickup is performed.

In a step S211, the image correction value is calculated in accordance with the condition of the optical system 1 and the characteristics of the optical system 1 using a similar method to that of the step S208.

In a step S212, correction (image processing) based on the image correction value is performed on the obtained image data.

In a step S213, the image performed to the image processing is displayed on the image display unit 8. Further, the image data are stored in the image storage unit 9.

It should be noted that in this embodiment, the objects are detected by the object recognition unit 21, but the object recognition unit 21 need not be provided, and instead, the focus position may be detected on the basis of the AF point selected by the photographer, whereupon the image restoration value is calculated on the basis of the focus position difference.

Effects of the second embodiment of this invention will now be described.

By using the object recognition unit 21 to detect the object and performing image pickup while focusing on the second object having the greatest image height of the composition, image data in which the second object having the greatest image height is in focus can be obtained. At this time, aberration on the second object decreases. Further, the first object near the optical axis similarly exhibits substantially rotationally symmetrical aberration. Therefore, an image on which both the first object and the second object are in focus can be created through simple image processing.

When the object corresponding to the AF point selected by the photographer from the plurality of AF points is in the position having the greatest image height of the composition, image pickup is performed while focusing on the object corresponding to the selected AF point. As a result, the photographer can obtain an intended image.

By calculating the image restoration value in accordance with the condition of the optical system 1, an image that is even more in focus can be obtained.

By calculating the image restoration value in accordance with the characteristics of the optical system 1 and calculating the image restoration value in accordance with the image height in particular, an image that is even more in focus can be obtained.

By storing the condition of the optical system 1 and the characteristics of the optical system 1 in advance, the image processing can be performed quickly.

By providing a plurality of AF points, the object can be brought into focus without moving the camera.

Figure 10:
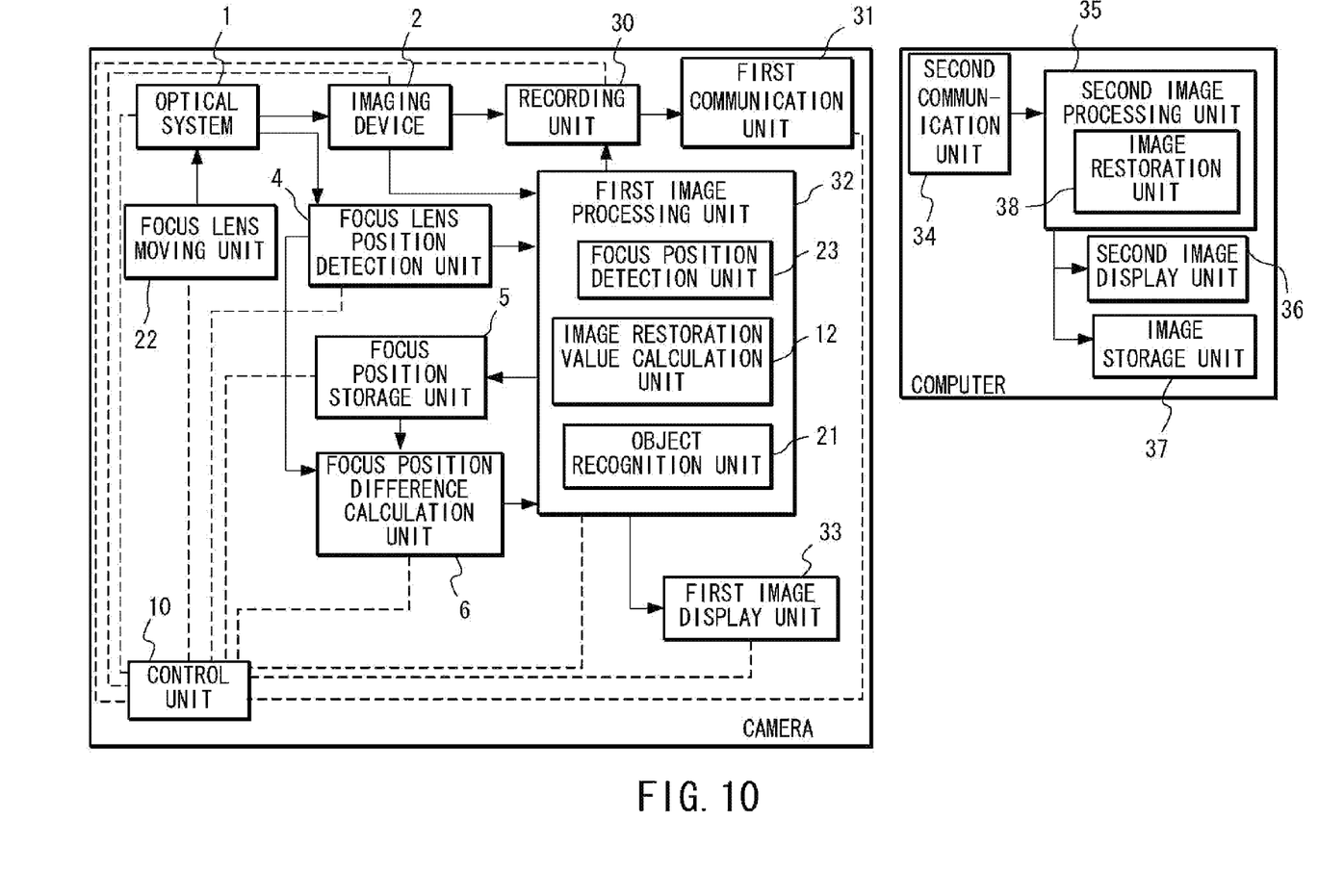
FIG. 10 is a schematic block diagram showing an image capturing system according to a third embodiment.

Next, a third embodiment of this invention will be described using FIG. 10. FIG. 10 is a schematic block diagram showing an image capturing system according to the third embodiment.

The image capturing system according to the third embodiment is constituted by an image capturing device and a processing device. In this embodiment, a case in which a camera is used as the image capturing device and a computer is used as the processing device will be described. However, this invention is not limited thereto.

The camera includes the optical system 1, the imaging device 2, the focus lens moving unit 22, the focus lens position detection unit 4, the focus position storage unit 5, the focus position difference calculation unit 6, a first image processing unit 32, a first image display unit 33, a recording unit 30, a first communication unit 31, and the control unit 10. Identical constitutions to the second embodiment have been allocated identical reference numerals in the third embodiment, and description thereof has been omitted.

The first image processing unit 32 includes the focus position detection unit 23, the image restoration value calculation unit 12, and the object recognition unit 21.

The recording unit 30 records the image data obtained by the imaging device 2. The recording unit 30 also records the image restoration value calculated by the image restoration value calculation unit 12. The image data and the image restoration value are recorded in correlation.

The first communication unit 31 reads the image data and image restoration value recorded in the recording unit 30, and transmits a signal indicating the image data and the image restoration value to a second communication unit 34 of the computer wirelessly.

The computer includes the second communication unit 34, a second image processing unit 35, a second image display unit 36, and an image storage unit 37.

The second communication unit 34 receives the signal indicating the image data and the image restoration value transmitted from the first communication unit 31, and transmits the received signal to the second image processing unit 35.

The second image processing unit 35 includes an image restoration unit 38. The image restoration unit 38 performs image processing on the received image data on the basis of the image restoration value.

The second image display unit 36 displays an image on the basis of image data created by the second image processing unit 35. The image storage unit 37 stores the image data created by the second image processing unit 35.

In the image capturing system according to the third embodiment, the image data obtained by the imaging device 2 and the image restoration value calculated by the image restoration value calculation unit 12 are stored in the recording unit 30 and transmitted from the first communication unit 31 to the second communication unit 34 of the computer. Image processing is then performed by the image restoration unit 38 on the basis of the image data and the image restoration value received by the second communication unit 34 of the computer, and as a result, an image that is in focus as a whole is created.

Effects of the third embodiment of this invention will now be described.

By transmitting the image data and the image restoration value from the first communication unit 31 of the camera to the second communication unit 34 of the computer, a storage capacity of the camera can be reduced. Further, the amount of image processing performed in the camera can be reduced. Furthermore, the image processing can be performed by the computer as required in a location removed from the camera.

It should be noted that in the above embodiments, cases in which two objects exist on the composition were described. However, this invention is not limited to such a case, and image pickup may be performed using the method described above in a case where three or more objects exist on the composition.

The respective embodiments are not limited to the constitutions described above, and may be realized through a combination of hardware and software. The embodiments themselves may also be combined.

In this case, the image capturing system includes a CPU, a main storage device such as a RAM, and a non-temporary computer-readable storage medium storing a program for realizing all or a part of the processing described above. The program will be referred to here as an image processing program. By having the CPU read the image processing program stored on the storage medium and execute information processing/calculation processing, similar processing to that of the image capturing system described above is realized.

Here, the non-temporary computer-readable storage medium is a magnetic disk, a magneto-optical disk, a CD-ROM, a DVD-ROM, a semiconductor memory, or similar. Alternatively, the image processing program may be distributed to a computer over a communication line, whereupon the computer, having received the distributed image processing program, executes the program.

The contents of Japanese Patent Application No 2009-141981, filed with the Japan Patent Office on Jun. 15, 2009, are incorporated herein in their entirety by reference.

What is claimed is:

1. An image capturing system comprising:
   a focus position moving unit that moves a focus position to a first focus position in which a first object is brought into focus and a second focus position which is different from the first focus position and in which second focus position a second object is brought into focus;
   an image acquisition unit that obtains unfocused image data by performing image pickup of the first object in the second focus position; and
   an image processing unit that performs image restoration processing on the obtained unfocused image data to form an output image in which the first object is in focus;
   a focus position difference calculation unit that calculates a focus position difference between the first focus position and the second focus position; and
   an image restoration value calculation unit that calculates an image restoration value on the basis of the focus position difference,
   wherein the image processing unit performs the image restoration processing on the basis of the image restoration value.

2. The image capturing system as defined in claim 1, wherein the second focus position is a focus position in which the second object is positioned further from an optical axis than the first object on a composition used during the image pickup.

3. The image capturing system as defined in claim 2, comprising an object detection unit that detects objects on the composition,
   wherein the second object is positioned furthest from the optical axis among the detected objects.

4. The image capturing system as defined in claim 1, comprising a focus position storage unit that stores at least one of the first focus position and the second focus position.

5. The image capturing system as defined in claim 1, wherein, when the first object is positioned furthest from an optical axis among a plurality of objects, the image acquisition unit obtains the image data by performing the image pickup in the first focus position.

6. The image capturing system as defined in claim 1, wherein the image restoration value calculation unit corrects the image restoration value on the basis of an image height of the second object.

7. The image capturing system as defined in claim 1, wherein the image restoration value calculation unit corrects the image restoration value in accordance with a condition of an optical system.

8. The image capturing system as defined in claim 1, wherein the image restoration value calculation unit corrects the image restoration value in accordance with a characteristic of an optical system.

9. The image capturing system as defined in claim 1, wherein the image restoration value calculation unit stores at least one of a condition of an optical system and a characteristic of the optical system.

10. The image capturing system as defined in claim 1, wherein the focus position moving unit moves the focus position on the basis of a distance measuring point selected from a plurality of distance measuring points.

11. The image capturing system as defined in claim 3, comprising an image display unit that displays a position of the detected object.

12. The image capturing system as defined in claim 11, wherein the image display unit does not display a distance measuring point that is not in the vicinity of the detected object.

13. The image capturing system as defined in claim 11, wherein the image display unit does not display an image based on image data obtained when the second object is brought into focus.

14. The image capturing system as defined in claim 1, comprising:
   an image capturing device that includes the focus position moving unit and the image acquisition unit; and
   an image processing device that includes the image processing unit.

15. The image capturing system as defined in claim 14, wherein the image capturing device comprises a first communication unit that transmits the image data, and
   the image processing device comprises a second communication unit that receives the image data transmitted from the first communication unit.

16. The image capturing system as defined in claim 1, wherein the focus position moving unit moves a focus lens in an optical axis direction.

17. An image capturing method comprising:
   moving a focus position from a first focus position in which a first object is brought into focus and a second focus position which is different from the first focus position and in which second focus position a second object is brought into focus, wherein the focus position is moved after bringing the first object into focus in order to obtain an image in which the first object is in focus;
   obtaining unfocused image data by performing image pickup of the first object in the second focus position;
   calculating a focus position difference between the first focus position and the second focus position;
   calculating an image restoration value on the basis of the focus position difference; and
   performing image restoration processing on the obtained unfocused image data to form an output image in which the first object is in focus, wherein the image restoration processing is performed on the basis of the image restoration value.

* * * * *